Patented Apr. 20, 1954

2,676,179

UNITED STATES PATENT OFFICE 2,676,179

SUBSTITUTED DELTA⁴ - TETRAHYDROPHTHALIMIDES AND PRODUCTION OF MALEIMIDES

Erhard J. Prill, Cresskill, N. J., assignor to United States Rubber Company, New York, N. Y., a corporation of New Jersey No Drawing. Application January 4, 1951,
Serial No. 204,495

4 Claims. (Cl. 260—326)

This invention relates to improvements in the preparation of maleimide and substituted maleimides.

In Patent No. 2,524,145 there is described the preparation of maleimide and N-substituted derivatives from derivatives of delta-4-tetrahydrophthalimide in which the carbon atoms of the 3 and 6 positions are connected through one of the class consisting of an alkylene group, a 9,10-anthrylene group, and an oxygen atom.

My present invention is based on the discovery that derivatives of delta-4-tetrahydrophthalimide in which carbon atoms of the 3- or the 3- and 6-positions are directly linked to monovalent alkyl hydrocarbon groups, can be directly decomposed pyrolytically to yield maleimide, or the N-hydrocarbon-substituted derivatives of maleimide.

This is unexpected since the same method applied to derivatives of delta-4-tetrahydrophthalimide in which the carbon atoms in the positions 3 and 6 have only hydrogen atoms attached thereto, such as delta-4-tetrahydrophthalimide and 4-methyl-delta-4-tetrahydrophthalimide, do not undergo pyrolytic decomposition to give maleimide.

The reaction is illustrated thus:

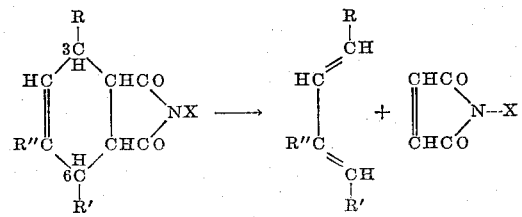

where R is alkyl; R' is hydrogen or alkyl; R'' is hydrogen or methyl; and X is selected from the class consisting of hydrogen, alkyl (e. g., methyl, ethyl, propyl, isopropyl, n-butyl, isobutyl, amyl, hexyl, cyclohexyl, heptyl, octyl, monyl, decyl, undecyl, dodecyl, stearyl, etc.), alkenyl (e. g., allyl, methallyl, crotyl, 4-pentenyl, 10-undecylenyl, etc.), aryl, (e. g., phenyl, tolyl, xylyl, xenyl, 2-naphthyl, etc.), and aralkyl (e. g., benzyl, phenethyl, etc.).

The starting delta-4-tetrahydrophthalimides can be made by the reaction of the appropriate conjugated diene with maleic anhydride and treatment of the product with an ammoniating agent, such as ammonia, ammonium hydroxide, or an ammonium salt, e. g., ammonium carbonate, or the proper corresponding amine, to secure conversion of the anhydride to the corresponding imide. Examples of conjugated dienes which, among others, will give adducts having substituents in the desired 3- or 3- and 6-positions are 1,3-pentadiene (i. e., piperylene), 2-methyl-1,3-pentadiene, and 2,4-hexadiene.

The reaction of my invention is carried out by heating the delta-4-tetrayhdrophthalimide derivative containing alkyl substituents in the 3- or the 3- and 6-positions at temperatures above its melting point, particularly in the range 300–600° C. A preferred method is to pass the vaporized delta-4-tetrahydrophthalimide derivative, in either the presence or the absence of an inert diluent, e. g., nitrogen, through a heated reaction tube of glass, iron, steel, nickel, etc. The tube may be packed with an inert, fragmented material such as beads or chips of quartz and glass to increase the surface area of contact within the reaction vessel. The rate at which the delta-4-tetrahydrophthalimide derivative is passed through the tube will vary somewhat with the particular starting material employed, the shape and relative dimensions of the reaction vessel, the temperature, and the pressure, which is ordinarily in the range from 1 mm. to 760 mm. However, contact times, calculated on the volume of free space in the reaction tube, of from 0.05–50.0 seconds and preferably from 0.05–10 seconds have proven satisfactory.

Under the above conditions, the delta-4-tetrahydrophthalimide derivative reacts almost exclusively to form the maleimide or N-substituted maleimide, and the conjugated diene. They can be collected at the exit of the reaction tube, together with unreacted starting material, if any. The latter may be recovered and recycled in the cracking process, and the conjugated diene can be reconverted to the delta-4-tetrahydrophthalimide derivative in the manner previously indicated, thus adding to the economy of the process.

The following examples disclose my invention in more detail. All parts are by weight, except as noted.

Example 1

(a). 3-methyl-delta-4-tetrahydrophthalimide, an apparently new compound, is first prepared by adding 250 parts (by volume) of concentrated ammonium hydroxide (29% NH₃) to a slurry of 224 parts of 3-methyl-delta-4-tetrahydrophthalic anhydride in 150 parts of water and de-watering by distillation to a pot temperature of 180° C. The crude imide (218 parts) slowly crystallizes after cooling. Three recrystallizations from a mixture of benzene and hexane give crystals melting at 85–95° C. The compound is apparently a mixture of optical or cis-trans isomers of 3-methyl-delta-4-tetrahydrophthalimide.

Analysis:
    Found: N, 8.31.
    Calculated: N, 8.5.

(b). Then 120 parts of 3-methyl-delta-4-tetrahydrophthalimide are vaporized at 2 mm. pressure and passed at 550° C. during the course of 5⅓ hours (contact time 0.2 sec.) through a 36-inch length of heat-resistant glass tubing of 30 mm. diameter, packed with quartz chips. The solid which collects in the receiver is fractionated to give 7.6 parts of maleimide, distilling at 115–125° C. at 6–8 mm. pressure. The remainder of the material recovered is unchanged starting material.

*Example 2*

(a). Two-hundred and ninety five (295) parts of 3,5-dimethyl-delta-4-tetrahydrophthalic anhydride are treated with a two-fold excess of concentrated ammonium hydroxide and the resulting salt is de-watered by distillation to give the apparently new chemical, 3,5-dimethyl-delta-4-tetrahydrophthalimide. A portion of the imide is recrystallized twice from a mixture of benzene and hexane to give colorless plates which soften at 70° C. and melt at 79° C. (The imide is apparently a mixture of isomers.)

Analysis:
    Found: N, 7.78.
    Calculated: N, 7.82.

(b). Fifty (50) parts of the above imide are vaporized at 8 mm. pressure and passed at 550° C. in the course of 150 minutes (contact time approximately 1 sec.) into the pyrolysis tube described in Example 1. Fractionation of the crude pyrolysate gives 3.2 parts of maleimide, M. P. 89–92° C. and 41.8 parts of recovered starting material.

*Example 3*

Hexadiene-2,4 (61.5 parts, 0.75 mole) is added in portions to maleic anhydride (98.0 parts, 1.0 mole) in benzene (300 parts by volume) kept at 40–45° C. by cooling. After 2 days at room temperature, the benzene, unreacted diene and maleic anhydride are removed by distillation under reduced pressure. The crude product weighs 80.0 parts and melts at 92–94° C. after recrystallization from water. Diels and Alder (Ann., 470, 102) gives an M. P. of 95–96° C. for 3,6-dimethyl-delta-4-tetrahydrophthalic anhydride.

Crude 3,6-dimethyl-delta-4-tetrahydrophthalic anhydride (74.0 parts, 0.41 mole) and concentrated ammonium hydroxide (100 parts by volume) are combined and agitated occasionally. After a day the lumps of the anhydride have changed into a flocculent precipitate of the ammonium salt. The mixture is then warmed on the steam bath while additional concentrated ammonium hydroxide (50 parts by volume) is added slowly, over a period of ½ hour. The clear solution is then de-watered by heating in a flask to a pot temperature of 175° C. On cooling, the product (75.0 parts) sets to a crystalline mass. Crystallization from a mixture of benzene and hexane followed by recrystallization from benzene gives fine needles of 3,6-dimethyl-delta-4-tetrahydrophthalimide, a novel chemical melting at 150–152° C.

Analysis:
    Calculated for $C_{10}H_9O_2N$: N, 8.0.
    Found: N, 7.5.

Crude 3,6-dimethyl-delta-4-tetrahydrophthalimide (42.5 parts) is distilled at 1 mm. into the pyrolysis tube used in Example 1 at 481–484° C. over a period of 75 minutes (contact time, 0.08 sec.). The pyrolysate (40.0 parts) is collected in an ice-cooled flask. It is fractionated to yield 1.1 parts of maleimide boiling at 110–115° C. at 4–5 mm. and melting at 91–93° C. The remainder of the condensate is starting material.

In a similar manner one may also obtain N-substituted maleimide. On treating the maleic anhydride-diene adducts with primary amines such as methylamine, ethylamine, butylamine, allylamine, aniline, benzylamine, etc., converting to the N-substituted bicyclic imide and then pyrolyzing as above, one obtains N-methyl, N-ethyl, N-butyl, N-allyl, N-phenyl, N-benzyl, etc., maleimides.

The two following experiments are shown only for contrast in order to demonstrate that delta-4-tetrahydrophthalimides which are substituted in neither the 3- nor the 6-position do not give maleimide when treated by the method of this invention used in Examples 1–3.

(A) Delta-4-tetrahydrophthalimide is prepared by adding 325 parts (by volume) of concentrated ammonium hydroxide (29% $NH_3$) to a slurry of 304 parts of delta-4-tetrahydrophthalic anhydride (M. P. 102–104° C.) in 200 parts of water. The resulting solution is concentrated on the steam bath and the syrup obtained in this manner is heated in a flask up to a pot temperature of 210° C., which is held for 30 minutes, to give 302.5 parts of the desired imide. A portion is distilled (B. P. 145° C. at 1 mm. Hg.) and recrystallized twice from acetone to give colorless, long prismatic crystals which melt at 135–136.5° C.

Analysis:
    Found: N, 9.28%.
    Calculated: N, 9.26%.

Next 48.4 parts of the crude delta-4-tetrahydrophthalimide are vaporized and passed through a 36-inch length of 30 mm. heat-resistant glass tubing, packed with quartz chips and maintained at 485° C. and 35 mm. pressure, in the course of 2 hours (contact time of approximately 3.9 seconds). The solid pyrolysate which collects in the receiver is fractionated at 1 mm. pressure. No maleimide is obtained. Only a few drops of an aromatic-smelling oil and 46.6 parts of starting material are obtained.

(B) 4-methyl-delta-4-tetrahydrophthalimide is prepared by adding 320 parts (by volume) concentrated ammonium hydroxide to 280 parts of 4-methyl-delta-4-tetrahydrophthalic anhydride (M. P. 63–64° C.) and de-watering by distillation to a pot temperature of 210° C. Two hundred and seventy-two (272) parts of crude imide are obtained. A portion recrystallized twice from ether gives transparent plates, which melt at 102–103° C.

Analysis:
    Found: N, 8.42, 8.36.
    Calculated: N, 8.49.

Twenty-four (24) parts of the 4-methyl-delta-4-tetrahydrophthalimide thus made are vaporized at 36 mm. pressure and passed through the pyrolysis tube kept at 480° C., in the course of 2 hours (C. T.–8.8 sec.), as in Example 1. No maleimide is obtained on fractionation of the pyrolysate, and 23 parts of starting material are recovered.

Having thus described my invention, what I claim and desire to protect by Letters Patent is:

1. A method of making maleimide and N-substituted derivatives thereof which comprises thermally decomposing in the vapor state, at a temperature in the range from about 300° C. to about 600° C., a compound of the formula

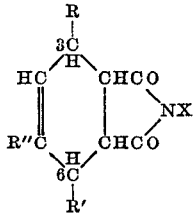

where R is alkyl; R' is a member from the class consisting of hydrogen, and alkyl; R'' is a member from the class consisting of hydrogen, and methyl; and X is selected from the class consisting of hydrogen, alkyl, alkenyl, aryl, and aralkyl.

2. A method of making maleimide which comprises thermally decomposing in the vapor state, at a temperature in the range from about 300° C. to about 600° C., a delta-4-tetrahydrophthalimide having an alkyl radical directly attached to the carbon atom in the 3-position.

3. A method of making maleimide which comprises thermally decomposing in the vapor state, at a temperature in the range from about 300° C. to about 600° C., a delta-4-tetrahydrophthalimide having separate alkyl radicals directly attached to the carbon atom in the 3- and 6-positions.

4. A chemical of the formula

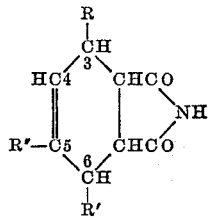

where R is methyl; R' is a member from the class consisting of methyl, and hydrogen; and R'' is a member from the class consisting of methyl, and hydrogen.

References Cited in the file of this patent

UNITED STATES PATENTS

| Number | Name | Date |
|---|---|---|
| 2,443,888 | Bohrer | June 22, 1948 |
| 2,524,145 | Tawney | Oct. 3, 1950 |

OTHER REFERENCES

Beilstein, Handbuch der Organischen Chemie, Vierte Auflange, vol. 21, page 425.